Dec. 26, 1922.

F. W. HOKAMP.
CLUTCH LEVER FOR SAMSON TRACTORS.
FILED JULY 15, 1921.

1,440,296.

Inventor
F. W. Hokamp,
By
Attorney

Patented Dec. 26, 1922.

1,440,296

UNITED STATES PATENT OFFICE.

FREDERICK W. HOKAMP, OF BELDEN, NEBRASKA.

CLUTCH LEVER FOR SAMSON TRACTORS.

Application filed July 15, 1921. Serial No. 484,919.

*To all whom it may concern:*

Be it known that I, FREDERICK W. HOKAMP, a citizen of the United States of America, residing at Belden, in the county of Cedar and State of Nebraska, have invented new and useful Improvements in Clutch Levers for Samson Tractors, of which the following is a specification.

The object of the invention is to provide a simple and efficient means for holding the clutch lever or pedal of a tractor, for example of the samson type in its clutch releasing or disengaging position and of locking the same in such released position to permit of leaving the tractor or dismounting from the driver's seat while the engine is in operation, without invoking the aid of an assistant, as when an adjustment is required necessitating the attention temporarily of the operator; and furthermore to provide in this connection a means for actuating the clutch pedal which can be actuated independently of the locking means as in the ordinary practice; and with these objects in view the invention consists in a construction and combination of parts of which a preferred embodiment is shown in the accompanying drawings, wherein:—

Figure 1:
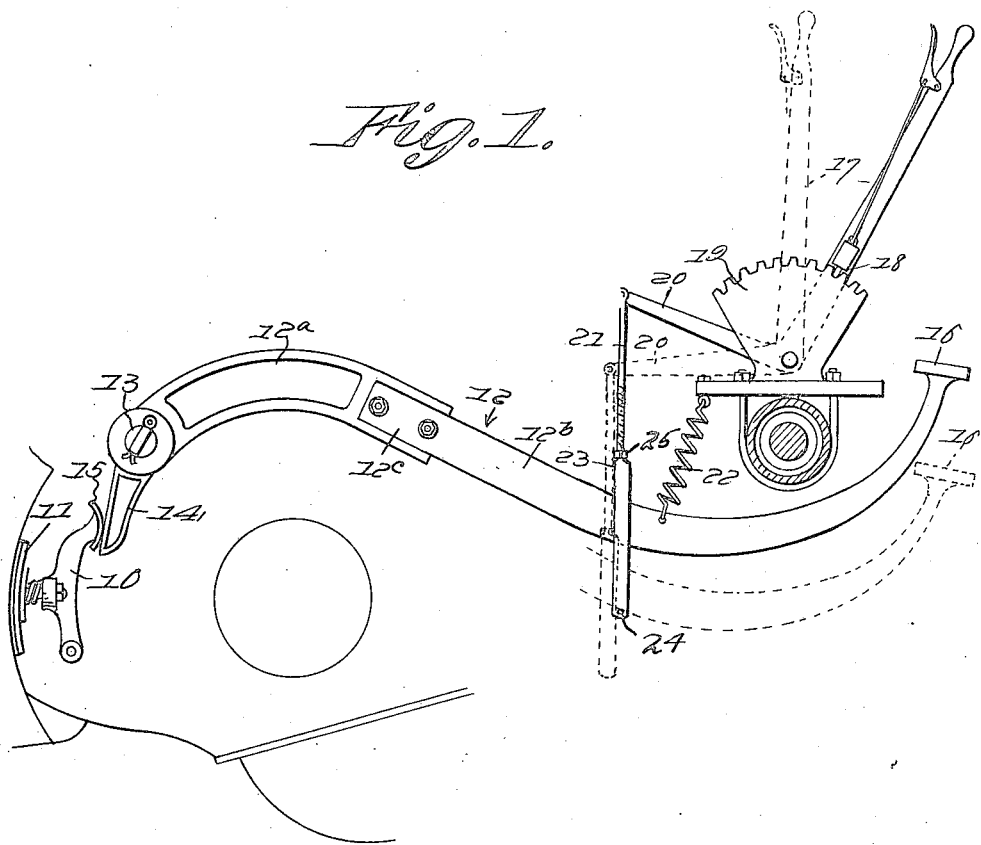
Figure 1 is a side view of a clutch pedal operating mechanism constructed in accordance with the invention.
Figure 2:
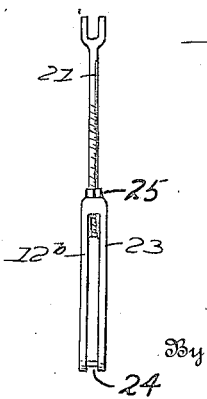
Figure 2 is a detail view of the connecting rod by which motion may be communicated from the locking lever to the operating lever.

The illustrated embodiment of the invention is employed in connection with the usual clutch pedal 10 having as in the ordinary practice a brake shoe 11, and an operating lever 12 fulcrumed as at 13 with a tongue 14 arranged in operative relation with the foot plate 15 of said clutch pedal, said operating lever being provided with a foot plate 16 which is within convenient reach of the operator or driver of the tractor. The operating lever offers a considerable and efficient leverage in the operation of the clutch pedal, and if preferred, as shown in the drawing, said lever may be in sections $12^a$ and $12^b$ jointed as at $12^c$ for compactness in shipping. The invention consists essentially in employing, in connection with said operating lever a locking lever 17 which in the construction illustrated has a hand lever also arranged within convenient reach of the operator with a locking pawl 18 traversing a toothed segment 19 and having an arm 20 connected by a link 21 with the operating lever. The operating lever is preferably yieldingly supported at its free end as by means of a spring 22 and an adjustable connection is afforded between the operating lever and the arm 20 of the locking or hand lever by means of a fork 23 arranged in straddling relation with the operating lever and provided with a lower stop pin 24, and a nut 25 mounted upon the fork and having threaded engagement with the link 21.

By means of the locking lever and its relation with the segment 19 the operating lever may be locked in any desired position of which two are shown respectively in full and dotted lines in Figure 1, so that when it is desired to hold the clutch pedal in clutch releasing position (see dotted lines in Figure 1), it is only necessary to disengage the pawl 18 from the teeth of the segment and move the operating lever to its depressed position either by means of pressure on the foot plate 16 or by the movement of the hand lever and then release said pawl for reengagement with the segment,—this operation being reversed when it is desired to permit of the movement of the clutch pedal to clutch engaging position which is that shown by the full lines.

Thus when it is desired to leave the machine or to dismount from the driver's seat with the engine in operation but with the clutches in released position the operating lever may be depressed either by foot pressure or by means of the hand lever and then locked to guard against any possibility of the machine resuming progress while the driver is absent from the seat and at the same time provide against the danger of injury to the operator in making any adjustment for which purpose he may have alighted from the machine.

Having described the invention, what is claimed as new and useful is:—

A clutch pedal operating means for tractors having a foot actuable operating lever, consisting of a hand actuable locking lever provided with a pawl arranged to traverse a toothed segment, an arm carried by the locking lever and a link connecting said arm with the operating lever, said link having an adjustable connection with the operating lever to vary the relation between the latter and the locking lever, said adjustable connection consisting of a fork straddling and attached to the operating lever and a nut carried thereby and having threaded engagement with said link.

In testimony whereof he affixes his signature.

FREDERICK W. HOKAMP.